Patented Sept. 20, 1932

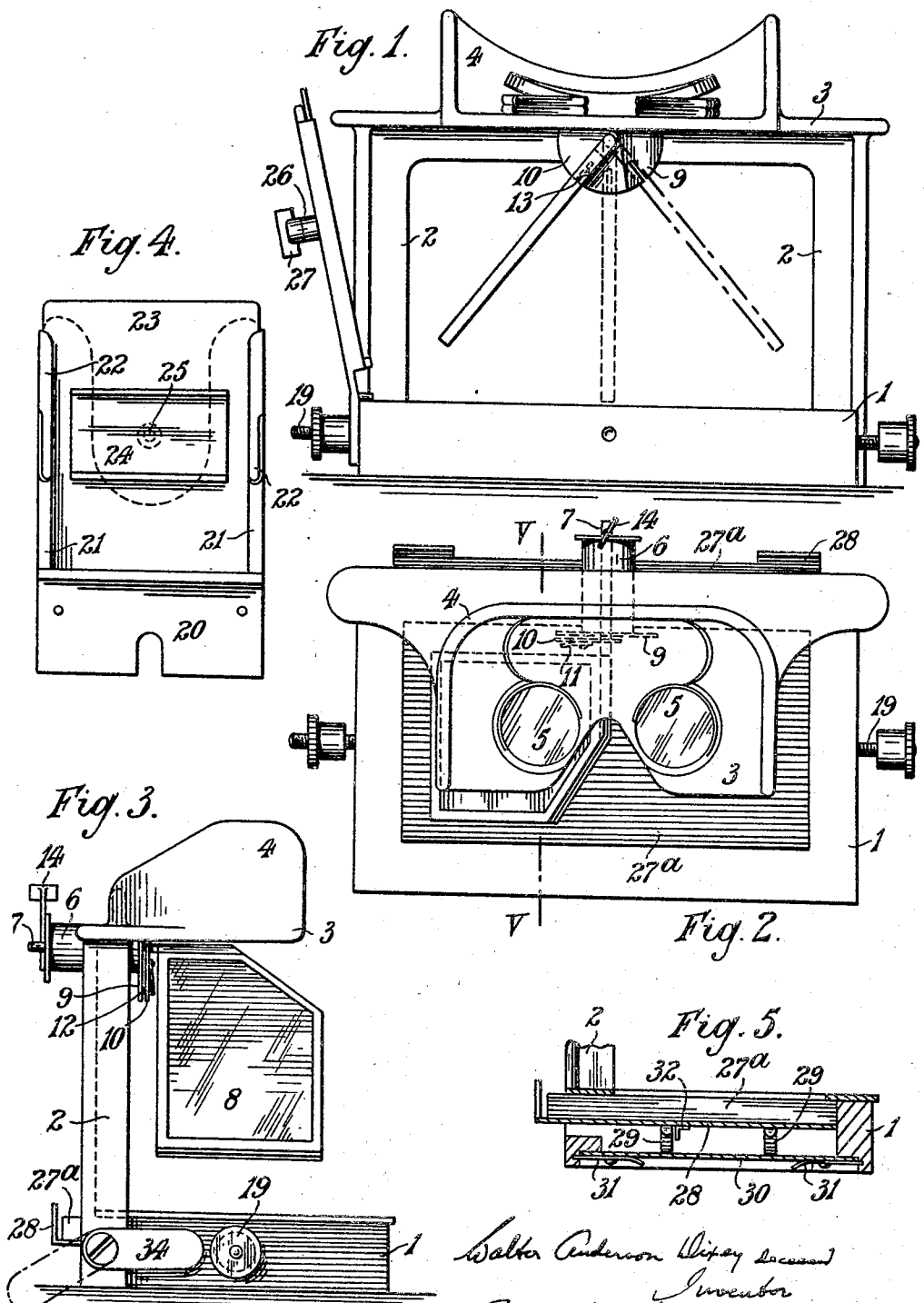

1,878,973

UNITED STATES PATENT OFFICE

WALTER ANDERSON DIXEY, DECEASED, LATE OF LONDON, ENGLAND, BY FANNY BEEBE DIXEY, EXECUTRIX, OF LONDON, ENGLAND, ASSIGNOR, BY MESNE ASSIGNMENTS, TO C. W. DIXEY & SON LIMITED, OF LONDON, ENGLAND

OPTICAL INSTRUMENT AND METHOD OF TREATMENT

Application filed December 5, 1929, Serial No. 411,963, and in Great Britain December 27, 1928.

This invention relates to an optical instrument.

The object of the present invention is to provide an instrument for the development of the sight of a dormant or amblyopic eye and also for exercising eyes with other defects.

The object of the present invention is to provide an instrument for providing physical and psychologic conditions contributing to the establishment, stimulation, control and development of coordination between the tactile senses of the dominant hand (right hand in righthanded individuals and left hand in lefthanded individuals) and the sense of sight as aroused through either eye or both eyes, and for coordination of the functions of the two eyes of a pair with each other through association with the dominant hand.

Preferably in conjunction with the lenses there is provided a mirror or mirrors which are so arranged as to allow an object to be seen through the lens for one eye only and thereby cause a "ghost" image of the object to be thrown upon the field of view of the other eye.

Lenses may be, when desirable, mounted in a frame shaped to support the forehead with the eyes in a correct position to use the lenses as in a binocular instrument.

Preferably a mirror is mounted in such a manner that it can be quickly and easily brought into the required position for exercising either the right eye or the left eye, said mirror being so arranged that it is frictionally retained in its adjusted position. For use in conjunction with this mirror one or more upright platforms or holders for the object to be reflected into the field of vision are provided at the sides of the instrument and said platforms or holders may be interchangeable at will.

The base of the instrument is preferably formed with a tablet or drawing pad, positioned at right angles to the line of vision.

The invention will now be described with reference to the accompanying drawing which shows one example of construction of the instrument in which:—

Fig. 1 is an elevation showing the instrument in its normal position resting on a flat surface, and showing the platform or holder for the object located at the left-hand side thereof.

Fig. 2 is a plan view thereof, but showing the instrument with the platform or holder for the object removed.

Fig. 3 is an end elevation also showing the instrument with the platform or holder for the object removed.

Fig. 4 is a face view of the platform or holder detached.

Fig. 5 is a cross sectional view of the base only of the instrument taken on the line V—V in Fig. 2.

The instrument shown in the drawing comprises a horizontal frame 1 forming a hollow base having upstanding supports 2 at its rear, which supports carry at their upper ends a horizontal forwardly extending plate 3 with an integral forehead support 4, in which the lenses are mounted in a similar manner to that in binoculars and similar optical instruments. Thus, by bending over the instrument, the head can be rested on the support with the eyes in the correct position to use the instrument. The lenses 5 of which there are 2 are mounted in the plate 3.

Beneath said plate 3 and located centrally of the lenses is fixed a bearing 6 for the spindle 7 of a double-faced mirror 8. The bearing 6 is provided at one side with a sector 9 and the spindle 7 is provided with a sector-shaped projection 10, with a spring 11 carrying a projection 12, which passes through a hole 13 in the sector 10, the arrangement being such that when the mirror is in position and the spindle is retained by the key 14 passing through a hole near the end thereof, the spring forces the projection 12 into engagement with the sector 9 and into slots 16 therein, so as to retain the mirror in one or three positions, one of which is shown in full lines in Fig. 1, another which is shown in dotted lines in Fig. 1, and the third of which is shown in chain dotted lines in Fig. 1, thus the mirror can be swung through its central position to the left or to the right according to the eye which is being exercised or tested and is resiliently held in the desired position. By removing the key 14 the mirror can be easily removed from the instrument by withdrawing its spindle 7 from the bearing 6.

The horizontal frame 1 is provided at both sides with clamping screws 19 adapted to retain in upright platform 20 having guides 21 with spring fingers 22 in which is slidably mounted and resiliently held a plate 23. On this plate 23 is mounted a holder 24 for a representation of the object to be thrown on to the field of vision. This holder 24 is provided with a rearwardly extending screwed shank 25 which passes through a boss 26 in the plate 23 and is adapted to be clamped to the plate in any adjusted position by means of the thumb nut 27. By loosening the nut 27 the holder 24 can be turned angularly into any suitable position. The holder for the representation may be otherwise fixed upon or be formed by the plate 23. The upright platform and the holder for the representation may be detached and may be interchanged by a similar device or the holder may be mounted at the opposite side of the instrument. When the holder is mounted at the left-hand side as shown in Fig. 1, the mirror 8 will be turned to the left as shown in full lines in Fig. 1. When the upright platform and the holder for the representation is mounted at the right-hand side of Fig. 1, the mirror 8 will be turned to extend to the right-hand side, as shown in chain dotted lines in Fig. 1.

The horizontal frame 1 serves as a receptacle for layers of paper 27$^a$, which are carried on a slide 28 which is pressed upwardly by means of the springs 29 fixed on a detachable base plate 30 which is retained in position by the turn clips 31. The slide 28 is normally retained against movement outwardly horizontally of the frame by means of the angle piece 32 engaging with the spring 29. With this arrangement a convenient pad is formed on the base of the instrument in which the top layer of the paper is always kept in the desired position relatively to the lenses, e. g. at the focal length of the lenses.

Hinged fingers 34 are fixed to the side of the instrument so that the instrument may be retained in a tilted position to afford a more convenient position for the patient.

When using the instrument, for instance in the treatment of squint, a representation of the object will be placed upon one of the holders therefor and this will be fixed by means of the upright platform at one side of the instrument and the mirror will be swung to a corresponding side of the instrument after which the patient will look with both eyes through the lenses. One eye will see the tablet or pad. The other eye will see the representation of the object reflected in the mirror, on the drawing pad upon which the patient can indicate with his hand the position of any feature of the image, or trace the image on the pad and by utilizing both the hand and the eye in the education of the dormant or amblyopic eye increase the patient's power of concentration and persistence and thus train and exercise the said eye and develop its sight. Many other illustrative uses of the device can be devised or will readily suggest themselves to the operator whereby the use of the device may be rendered entertaining to the patient. For instance a checker board may be used as the object and the patient can practice by placing a checker or chess man in a particular spot on the board as reflected on the pad or tablet.

Various modifications of the structure of the device will also readily suggest themselves to those skilled in the art; but within the scope of the present invention as claimed.

What is claimed as the invention and desired to be secured by Letters Patent is:—

1. An instrument for training the ocular muscles and for development of the sight of a dormant or amblyopic eye comprising a frame shaped to form a support for a patient's forehead, lenses spaced apart in said frame one for each of the patient's eyes, an upright platform for carrying an object, means for detachably mounting said platform at either side of the said frame, a mirror mounted between said lenses and adapted to throw a reflection of said object into the field of view of one eye and a tablet in the field of vision of a person whose head is supported on the rest accessible to his hand.

2. An instrument for training the ocular muscles and for development of the sight of a dormant or amblyopic eye comprising a frame with a base having an open top adapted to contain loose sheets of paper, a raised support for the patient's forehead, lenses in said raised support one for each of the patient's eyes, an upright platform for carrying an object, means for detachably mounting said upright platform at either end of said base, a mirror between said lenses and said base and support adapted to throw a reflection of the object into the field of view of one eye coinciding with the paper in said frame as seen directly by the other eye.

3. An instrument for training the ocular muscles and for development of the sight of a dormant or amblyopic eye comprising a frame with a base having an opening in its top, a slide adapted to carry sheets of paper and to be slidable into and out of the base, means for spring pressing said slide upwardly in said base, a raised support for the patient's forehead, an upright platform for carrying an object, means for detachably mounting said upright platform at either end of said base, a mirror between said lenses and said base and support adapted to throw a reflection of the object into the field of view of one eye coinciding with the top sheet of paper in said frame as seen directly by the other eye.

4. An instrument for training the ocular muscles and for development of the sight of a dormant or amblyopic eye comprising, a frame with a base having an open top adapted to contain loose sheets of paper, hinged extensions on said base adapted to allow this to be tilted into a convenient position, a raised support for the patient's forehead, an upright platform for carrying an object, means for detachably mounting said upright platform at either end of said base, a mirror between said lenses and said base and support adapted to throw a reflection of the object into the field of view of one eye superimposed on the paper in said frame as seen directly by the other eye.

5. An instrument for training the ocular muscles and for development of the sight of a dormant or amblyopic eye comprising a frame shaped to form a support for a patient's forehead, lenses spaced apart in said frame one for each of the patient's eyes, an upright platform, a holder for a representation of an object detachably and adjustably mounted in said upright platform, means for detachably mounting said platform at either side of the said frame, a mirror mounted between said lenses and adapted to throw a reflection of said object into the field of view of one eye and a tablet positioned in the field of vision of a person whose head is supported on the rest and accessible to his hand.

In witness whereof I have hereunto set my hand.

FANNY BEEBE DIXEY,
*Executrix of the Estate of Walter Anderson Dixey, Deceased.*